United States Patent
Guo et al.

(10) Patent No.: US 9,445,420 B2
(45) Date of Patent: Sep. 13, 2016

(54) DOWNLINK DATA RATE-MATCHING METHOD AND DEVICE

(71) Applicant: ZTE CORPORATION, Shenzhen, Guangdong Province (CN)

(72) Inventors: Senbao Guo, Shenzhen (CN); Yu Ngok Li, Shenzhen (CN); Yunfeng Sun, Shenzhen (CN); Junfeng Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 9 days.

(21) Appl. No.: 14/425,297

(22) PCT Filed: Aug. 9, 2013

(86) PCT No.: PCT/CN2013/081241
§ 371 (c)(1),
(2) Date: Mar. 2, 2015

(87) PCT Pub. No.: WO2014/032508
PCT Pub. Date: Mar. 6, 2014

(65) Prior Publication Data
US 2015/0223254 A1    Aug. 6, 2015

(30) Foreign Application Priority Data

Aug. 29, 2012  (CN) .......................... 2012 1 0311216

(51) Int. Cl.
*H04W 72/04*    (2009.01)
*H04L 1/00*    (2006.01)
*H04L 12/18*    (2006.01)

(52) U.S. Cl.
CPC .......... *H04W 72/0493* (2013.01); *H04L 1/003* (2013.01); *H04L 1/0013* (2013.01); *H04L 12/18* (2013.01); *H04W 72/042* (2013.01)

(58) Field of Classification Search
CPC  H04W 72/0493; H04W 72/042; H04L 1/00; H04L 1/0013; H04L 12/18
USPC ......................................................... 370/312
See application file for complete search history.

(56) References Cited

U.S. PATENT DOCUMENTS

2012/0113917 A1* 5/2012 Gaal ..................... H04L 5/0058
370/329
2013/0242947 A1* 9/2013 Chen ..................... H04W 72/04
370/335

FOREIGN PATENT DOCUMENTS

| CN | 102325000 | 1/2012 |
|---|---|---|
| CN | 102355340 | 2/2012 |
| CN | 102404689 | 4/2012 |
| WO | WO 2008127166 | 10/2008 |

OTHER PUBLICATIONS

International Search Report from corresponding Appl. No. PCT/CN2013/081241, dated Oct. 24, 2013.

* cited by examiner

*Primary Examiner* — Ronald B Abelson
(74) *Attorney, Agent, or Firm* — Koppel, Patrick, Heybl & Philpott

(57) ABSTRACT

Provided are a downlink data rate-matching method and device, the method including: a UE acquiring one of the following information: one or more sets of rate-matching resource indication information configured by a base station and used for instructing the UE to perform rate-matching, one or more sets of rate-matching resource indication information and combined rate-matching resource indication information, and rate-matching resource indication information of a serving cell of the UE acquired when the UE accesses a network; the UE determining a DCI Format corresponding to downlink grant indication information in a subframe of downlink control information transmitted by the base station; and the UE determining rate-matching resource information corresponding to the DCI Format and used for rate-matching according to the DCI Format and a preset corresponding relationship, and conducting downlink data rate-matching according to the rate-matching resource information. The solution improves rate-matching accuracy.

36 Claims, 4 Drawing Sheets

DOWNLINK DATA RATE-MATCHING METHOD AND DEVICE

TECHNICAL FIELD

The disclosure relates to the field of communications, in particular to a downlink data rate-matching method and device.

BACKGROUND

After release of 3$^{rd}$ Generation Partnership Project (3GPP) R8/9/10, the 3GPP continues to accurately research the technique of release R11 regarding the Long Term Evolution (LTE). At present, some of R8 products are available in the market, and R9 and R10 products may need to be further planned.

After stages of R8 and R9, many new features are added to R10 on the basis of the previous two releases, e.g., pilot features such as demodulation reference signal (DMRS) and channel state information reference signal (CSI-RS), transmission and feedback features supporting 8 antennae, in particular, the enhanced inter-cell interference cancelling (eICIC) technology is taken to further consider the technique for avoiding inter-cell interference on the basis of the ICIC technique in R8/9. As regards the techniques for solving the inter-cell interference problem, the technique for avoiding the cell interference in a homogeneous network is primarily considered at the initial stage of R10, with the mainstream technology considering eICIC technology and coordinated multi-point (CoMP) technology. CoMP refers to that multiple points transmit data in coordination to one or more UEs on the same time frequency resource or on different time frequency resources, and thus CoMP may reduce the inter-cell interference, improve the cell edge throughput rate, and enlarge the cell coverage. However, in the later discussion, considering the situation of more scenarios introduced into the heterogeneous network as well as the complexity of CoMP technology and the discussion time limit on R10, it is finally determined not to introduce additional CoMP standardized contents at the stage of R10, and part of CoMP requirements will be considered when designing CSI-RS, and thus there is no further discussion on CoMP technique after the 60 bis conference.

LTE defines that physical downlink control channel (PDCCH) carries scheduling and allocation as well as other control information. Each PDCCH consists of several control channels (CCEs), the number of CCEs in each subframe is determined by the number of PDCCHs and the downlink bandwidth.

User equipment (UE) obtains PDCCH by blind detection in a search space. The search space includes common search space and user-specific search space. The common search space is a region that can be searched by all UEs and carries cell-specific information; and the user-specific search space is a space range that can be searched by a single UE, the user-specific search spaces of multiple UEs may be overlapped, but the general initial search locations of the user-specific search spaces of different UEs are different. Before the UE performs blind detection, a base station generally notifies the UE, via high layer signaling, the to-be-used operating mode and the radio network temporary identity (RNTI) type used for PDCCH and subjected to cyclic redundancy check (CRC) scrambling.

The relationship among the search space $S_k^{(L)}$ and aggregation level L as well as the number of candidate PDCCH $M^{(L)}$ is shown Table 1. The aggregation level is the number of CCEs occupied by the PDCCH. When a UE performs blind detection in a user-specific search space, the UE firstly calculates an initial location $Y_k$ of blind detection according to UE ID (user identification) and subframe number, and then detects in the user-specific search space until detecting the PDCCH allocated to this UE.

TABLE 1

PDCCH candidate set

| Search space $S_k^{(L)}$ | | | |
|---|---|---|---|
| Type | Aggregation level L | Size [number of CCEs] | Number of candidate PDCCH $M^{(L)}$ |
| user-specific (UE-specific) | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

The corresponding relationship between the aggregation level and the relative location of the first control channel element of PDCCH in the user-specific search space is shown in Table 2. The relative location of the first control channel element of PDCCH in the user-specific search space refers to the offset of the location of the index nCCE of the first CCE occupied by the PDCCH relative to the initial location $Y_k$ of blind detection (the relative location is represented by nCCE, offset in the present application), nCCE, offset=nCCE-$Y_k$. As shown in Table 2, it is a schematic diagram showing a possible location of the first CCE in a user-specific search space and the corresponding aggregation level.

TABLE 2

Corresponding relationship between aggregation level and location of the first CCE

| Aggregation Level | Relative location of the first CCE in the user-specific search space |
|---|---|
| L = 1 | nCCE, offset = 0/1/2/3/4/5 |
| L = 2 | nCCE, offset = 0/2/4/6/8/10 |
| L = 3 | nCCE, offset = 0/4 |
| L = 4 | nCCE, offset = 0/8 |

During the discussion in 3GPP RAN1#67 related to the LTE Technology, the proposals on downlink control signaling are all substantially on enhancement of CSI-RS signaling, enhancement of DMRS signaling, enhancement of cell-specific reference signal (CRS) collision and interference problem avoidance, enhancement of PDSCH start symbol alignment and receiving, and enhancement of zero power and non-zero power CSI-RS collision and interference avoidance. The enhancement of CRS collision and interference problem avoidance, enhancement of PDSCH start symbol alignment and receiving, and enhancement of avoiding zero power and non-zero power CSI-RS collision and interference avoidance all fall within the range of rate-matching, and are collectively referred to as an interference avoidance method. In these methods, rate-matching or interference suppression may be performed according to the notified signaling, with the main reason that: in the newly added scenarios of R11, especially in Scenarios 1-3, since different points have different cell identities, the CRS location is different at different points, such that the sequences of different points are different. At this time, if different points perform joint transmission (JT), resource merging of different points cannot be aligned. If data mapping is performed independently according to the configuration of CRS, PDSCH start symbol or zero power CSI-RS of each cell, data merge errors will occur due to different Muting resource locations; and if merging is performed according to the master service point, it will cause resource waste and also introduce the interference of CRS of other points on data. In addition, for dynamic point selection (DPS), since different subframes are transmitted to a UE by different points, transmitting data according to the master service point will also cause the resource waste and the interference of CRS on data. If considering measuring the interference using zero power CSI-RS, it requires to configure more zero power CSI-RSs, moreover, if a UE configured in a zero power CSI-RS subframe of a point does not aware of the existence of the zero power CSI-RS, it may cause large influence on this UE.

As to the problem of low accuracy of downlink data rate-matching in the related art, no effective solution has been proposed at present.

SUMMARY

As to the problem of low accuracy of downlink data rate-matching in the related art, the embodiments of the disclosure provide a downlink data rate-matching method and device to at least solve the above-mentioned problem.

According to one embodiment of the disclosure, provided is a downlink data rate-matching method, including: a user equipment (UE) acquiring one of the following information: one or more sets of rate-matching resource indication information configured by a base station for instructing the UE to carry out rate-matching, the one or more sets of rate-matching resource indication information and combined rate-matching resource indication information, wherein the combined rate-matching resource indication information is used for indicating combination of the one or more sets of rate-matching resource indication information, and rate-matching resource indication information of a serving cell of the UE acquired when the UE accesses a network; the UE determining downlink control information format (DCI Format) corresponding to downlink grant indication information in a subframe of downlink control information transmitted from the base station; and the UE determining rate-matching resource information for rate-matching corresponding to the DCI Format according to the DCI Format and a preset corresponding relationship, and carrying out a rate-matching operation for downlink data according to the rate-matching resource information, wherein the preset corresponding relationship includes one of the following: a corresponding relationship between the one or more sets of rate-matching resource indication information and the DCI Format, a corresponding relationship between the rate-matching resource indication information of the serving cell and the DCI Format, and a corresponding relationship between the combined rate-matching resource indication information and the DCI Format.

In an example embodiment, the UE determining the rate-matching resource information for rate-matching corresponding to the DCI Format according to the DCI Format and the preset corresponding relationship includes one of the following: when the DCI Format corresponding to the downlink grant indication information is DCI Format 1A, the UE determining that the first set of rate-matching resource indication information or the rate-matching resource indication information corresponding to the lowest index notified by the base station via high layer signaling is the resource information for rate-matching; when the DCI Format corresponding to the downlink grant indication information is the DCI Format 1A, the UE determining that the rate-matching resource indication information of the serving cell of the UE acquired when the UE accesses a network is the resource information for rate-matching; when the DCI Format corresponding to the downlink grant indication information is the DCI Format 1A, the UE determining that one set of rate-matching resource indication information configured for the DCI Format 1A by the base station via terminal-specific high layer signaling is the resource information for rate-matching; when the DCI Format corresponding to the downlink grant indication information is the DCI Format 1A, the UE determining that the base station instructs, for the DCI Format 1A of the UE, via first preset resource indication information to select which one of two sets of resource indication information configured via terminal-specific high layer signaling to serve as the resource information for rate-matching; when the DCI Format corresponding to the downlink grant indication information is the DCI Format 1A, the UE determining that the base station uses second preset resource indication information corresponding to a preset state as the resource information for rate-matching, wherein contents of the second preset resource indication information are notified to the UE via the high layer signaling; and when the DCI Format corresponding to the downlink grant indication information is DCI Format 2B, DCI Format 2C or DCI Format 2D, the UE determining that third preset resource indication information in multiple sets of rate-matching resource indication information indicated by the base station via the high layer signaling is the resource information for rate-matching, wherein the third preset resource indication information is indicated via a preset bit in the downlink grant indication information.

In an example embodiment, the first preset resource indication information is indicated via localized virtual resource block/distributed virtual resource block (LVRB/DVRB) allocation bit in the DCI Format 1A in a Multicast Broadcast Single Frequency Network (MBSFN) subframe.

In an example embodiment, when there is one preset state, rate-matching resource indication information corresponding to the one preset state is used as the resource information for rate-matching; when there are two preset states, LVRB/DVRB allocation bit in the DCI Format 1A in an MBSFN subframe is used for instructing the UE to select the rate-matching resource indication information corresponding to which one of the two preset states as the resource information for rate-matching.

In an example embodiment, the combined rate-matching resource information or rate-matching resource indication information corresponding to the second preset resource indication information is indicated via the preset state, wherein the combined rate-matching resource information includes resources corresponding to one or more sets of rate-matching resource indication information.

In an example embodiment, the combined rate-matching resource indication information or rate-matching resource indication information corresponding to the third preset resource indication information is indicated via the preset bit, wherein the combined rate-matching resource indication information includes resources corresponding to one or more sets of rate-matching resource indication information.

In an example embodiment, when the preset state is a state of 0, the corresponding second preset resource indication information is rate-matching resource combination state 0;

or when the preset state is a state of 00, the corresponding second preset resource indication information is rate-matching resource combination state 0; or when the preset state is a state of 0, the corresponding second preset resource indication information is the first set of rate-matching resource; or when the preset state is a state of 00, the corresponding second preset resource indication information is the first set of rate-matching resource.

In an example embodiment, the preset bit being 0 indicates that the third preset resource indication information is rate-matching resource combination state 0, and the preset bit being 1 indicates that the third preset resource indication information is rate-matching resource combination state 1; or the preset bit being 00 indicates that the third preset resource indication information is rate-matching resource combination state 0, and the preset bit being 01 indicates that the third preset resource indication information is rate-matching resource combination state 1; or the preset bit being 10 indicates that the third preset resource indication information is rate-matching resource combination state 2, and the preset bit being 11 indicates that the third preset resource indication information is rate-matching resource combination state 3; or the preset bit being 0 indicates that the third preset resource indication information is the first set of rate-matching resource, and the preset bit being 1 indicates that the third preset resource indication information is the second set of rate-matching resource; or the preset bit being 00 indicates that the third preset resource indication information is the first set of rate-matching resource, and the preset bit being 01 indicates that the third preset resource indication information is the second set of rate-matching resource; or the preset bit being 10 indicates that the third preset resource indication information is the third set of rate-matching resource, and the preset bit being 11 indicates that the third preset resource indication information is the third or fourth set of rate-matching resource.

In an example embodiment, the preset bit is a newly added bit in the downlink grant indication information or an Nscid bit in the downlink grant indication information.

In an example embodiment, the one set of rate-matching resource indication information or each set of rate-matching resource indication information in the multiple sets of rate-matching resource indication information includes at least one of the following: location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information, wherein the non-zero power CSI-RS configuration information at least includes the number of CSI-RS ports, CSI-RS period and subframe offset information, CSI-RS sequence identification information and CSI-RS resource element location information; the zero power CSI-RS configuration information at least includes zero power CSI-RS resource element location information, and zero power CSI-RS period and subframe offset information.

In an example embodiment, configurations for the number of the CRS ports include 0 port configuration, 1 port configuration, 2 port configuration and 4 port configuration.

In an example embodiment, the CRS resource location information includes CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2 indicated via 2-bit signaling, respectively representing that the CRS frequency shifts are 0-2.

In an example embodiment, the CRS resource location information includes CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2 indicated via 3-bit signaling, respectively representing that the CRS frequency shifts are 0-2.

In an example embodiment, CRS port information and frequency domain resource location information are indicated using 9-bitmap signaling.

In an example embodiment, the CRS resource location information configures a corresponding cell identity (ID) to acquire the resource location information corresponding to CRS.

In an example embodiment, the combined rate-matching resource indication information is configured by the base station and notified to the UE via high layer signaling to notify the UE of multiple rate-matching resource combinations, and indicate the rate-matching resource indication information contained in each rate-matching resource combination in each of the combined rate-matching resource indication information.

According to another embodiment of the disclosure, provided is a downlink data rate-matching method, including: a base station determining combined rate-matching resource indication information or one or more sets of rate-matching resource indication information for instructing a user equipment (UE) to carry out rate-matching, wherein the combined rate-matching resource indication information is used for indicating the combination of the one or more sets of rate-matching resource indication information; the base station transmitting the one or more sets of rate-matching resource indication information or transmitting the one or more sets of rate-matching resource indication information and the combined rate-matching resource indication information to the UE, activating the UE to determine, according to a downlink control information format (DCI Format) corresponding to downlink grant indication information in a subframe of downlink control information transmitted from the base station and a preset corresponding relationship, rate-matching resource information for rate-matching corresponding to the DCI Format, and carry out a rate-matching operation for downlink data according to the rate-matching resource information, wherein the preset corresponding relationship includes one of the following: a corresponding relationship between the one or more sets of rate-matching resource indication information and the DCI Format, a corresponding relationship between rate-matching resource indication information of a serving cell and the DCI Format, and a corresponding relationship between the combined rate-matching resource indication information and the DCI Format.

In an example embodiment, the preset corresponding relationship includes one of the following: when the DCI Format corresponding to the downlink grant indication information is DCI Format 1A, determining that the first set of resource indication information or the rate-matching resource indication information corresponding to the lowest index notified by the base station via high layer signaling is the resource information for rate-matching; when the DCI Format corresponding to the downlink grant indication information is the DCI Format 1A, determining that the rate-matching resource indication information of serving cell of the UE acquired when the UE accesses a network is the resource information for rate-matching; when the DCI Format corresponding to the downlink grant indication information is the DCI Format 1A, determining that one set of rate-matching resource indication information configured for the DCI Format 1A by the base station via terminal-specific high layer signaling is the resource information for rate-matching; when the DCI Format corresponding to the downlink grant indication information is the DCI Format 1A, determining that the base station instructs, for the DCI Format 1A of the UE, via first preset resource indication information to select which one of two sets of resource indication information configured via terminal-specific high layer signaling to serve as the resource information for rate-matching; when the DCI Format corresponding to the downlink grant indication information is the DCI Format 1A, determining that second preset resource indication information corresponding to a preset state is the resource information for rate-matching, wherein contents of the second preset resource indication information are notified to the UE via the high layer signaling; and when the DCI Format corresponding to the downlink grant indication information is DCI Format 2B, DCI Format 2C or DCI Format 2D, determining that third preset resource indication information in multiple sets of rate-matching resource indication information indicated by the base station via the high layer signaling is the resource information for rate-matching, wherein the third preset resource indication information is indicated via a preset bit in the downlink grant indication information.

In an example embodiment, the first preset resource indication information is indicated via localized virtual resource block/distributed virtual resource block (LVRB/DVRB) allocation bit in the DCI Format 1A in a Multicast Broadcast Single Frequency Network (MBSFN) subframe.

In an example embodiment, when there is one preset state, the rate-matching resource indication information corresponding to the one preset state is used as the resource information for rate-matching; when there are two preset states, LVRB/DVRB allocation bit in the DCI Format 1A in an MBSFN subframe is used for instructing the UE to select the rate-matching resource indication information corresponding to which one of the two preset states as the resource information for rate-matching.

In an example embodiment, the preset bit is a newly added bit in the downlink grant indication information or an Nscid bit in the downlink grant indication information.

According to still another embodiment of the disclosure, provided is a downlink data rate-matching device applied to user equipment (UE), including: an acquisition component configured to acquire one of the following information: one or more sets of rate-matching resource indication information configured by a base station for instructing the UE to carry out rate-matching, the one or more sets of rate-matching resource indication information and combined rate-matching resource indication information, wherein the combined rate-matching resource indication information is used for indicating combination of the one or more sets of rate-matching resource indication information, and rate-matching resource indication information of a serving cell of the UE acquired when the UE accesses a network; a first determination component configured to determine downlink control information format (DCI Format) corresponding to downlink grant indication information in a subframe of downlink control information transmitted from the base station; a second determination component configured to determine rate-matching resource information for rate-matching corresponding to the DCI Format according to the DCI Format and a preset corresponding relationship; and a processing component configured to carry out a rate-matching operation for downlink data according to the rate-matching resource information, wherein the preset corresponding relationship includes one of the following: a corresponding relationship between the one or more sets of rate-matching resource indication information and the DCI Format, a corresponding relationship between the rate-matching resource indication information of the serving cell and the DCI Format, and a corresponding relationship between the combined rate-matching resource indication information and the DCI Format.

In an example embodiment, the second determination component includes: a third determination component configured to, when the DCI Format corresponding to the downlink grant indication information is DCI Format 1A, determine the first set of rate-matching resource indication information or the rate-matching resource indication information corresponding to the lowest index notified by the base station via high layer signaling is the resource information for rate-matching; or a fourth determination component configured to, when the DCI Format corresponding to the downlink grant indication information is the DCI Format 1A, determine that the rate-matching resource indication information of the serving cell of the UE acquired when the UE accesses a network is the resource information for rate-matching; or a fifth determination component configured to, when the DCI Format corresponding to the downlink grant indication information is the DCI Format 1A, determine that one set of rate-matching resource indication information configured for the DCI Format 1A by the base station via terminal-specific high layer signaling is the resource information for rate-matching; or a sixth determination component configured to, when the DCI Format corresponding to the downlink grant indication information is the DCI Format 1A, determine that the base station instructs, for the DCI Format 1A of the UE, via first preset resource indication information to select which one of two sets of resource indication information configured via terminal-specific high layer signaling to serve as the resource information for rate-matching; or a seventh determination component configured to, when the DCI Format corresponding to the downlink grant indication information is the DCI Format 1A, determine that the base station uses second preset resource indication information corresponding to a preset state as the resource information for rate-matching, wherein contents of the second preset resource indication information are notified to the UE via the high layer signaling; or an eighth determination component configured to, when the DCI Format corresponding to the downlink grant indication information is DCI Format 2B, DCI Format 2C or DCI Format 2D, determine that third preset resource indication information in multiple sets of rate-matching resource indication information indicated by the base station via the high layer signaling is the resource information for rate-matching, wherein the third preset resource indication information is indicated via a preset bit in the downlink grant indication information.

According to still another embodiment of the disclosure, provided is a downlink data rate-matching device applied to base station, including: a ninth determination component configured to determine combined rate-matching resource indication information or one or more sets of rate-matching resource indication information for instructing a user equipment (UE) to carry out rate-matching, wherein the combined rate-matching resource indication information is used for indicating the combination of the one or more sets of rate-matching resource indication information; a transmitting component configured to transmit the one or more sets of rate-matching resource indication information or transmit the one or more sets of rate-matching resource indication information and the combined rate-matching resource indication information to the UE, activate the UE to determine, according to a downlink control information format (DCI Format) corresponding to downlink grant indication information in a subframe of downlink control information transmitted from the base station and a preset corresponding relationship, rate-matching resource information for rate-matching corresponding to the DCI Format, and to carry out a rate-matching operation for the downlink data according to the rate-matching resource information, wherein the preset corresponding relationship includes one of the following: a corresponding relationship between the one or more sets of rate-matching resource indication information and the DCI Format, a corresponding relationship between rate-matching resource indication information of a serving cell and the DCI Format, and a corresponding relationship between the combined rate-matching resource indication information and the DCI Format.

In an example embodiment, the preset corresponding relationship includes one of the following: when the DCI Format corresponding to the downlink grant indication information is DCI Format 1A, determining that the first set of resource indication information or the rate-matching resource indication information corresponding to the lowest index notified by the base station via high layer signaling is the resource information for rate-matching; when the DCI Format corresponding to the downlink grant indication information is the DCI Format 1A, determining that the resource indication information of serving cell detected when accessing a network is the resource information for rate-matching; when the DCI Format corresponding to the downlink grant indication information is the DCI Format 1A, determining that one set of resource indication information configured for the DCI Format 1A by the base station via terminal-specific high layer signaling is the resource information for rate-matching; when the DCI Format corresponding to the downlink grant indication information is the DCI Format 1A, determining that the base station instructs, for the DCI Format 1A of the UE, via first preset resource indication information to select which one of two sets of resource indication information configured via terminal-specific high layer signaling to serve as the resource information for rate-matching; when the DCI Format corresponding to the downlink grant indication information is the DCI Format 1A, determining that second preset resource indication information corresponding to a preset state is the resource information for rate-matching, wherein contents of the second preset resource indication information are notified to the UE via the high layer signaling; and when the DCI Format corresponding to the downlink grant indication information is DCI Format 2B, DCI Format 2C or DCI Format 2D, determining that third preset resource indication information in multiple sets of rate-matching resource indication information indicated by the base station via the high layer signaling is the resource information for rate-matching, wherein the third preset resource indication information is indicated via a preset bit in the downlink grant indication information.

By the disclosure, the UE determines the rate-matching resource information for rate-matching corresponding to the DCI Format according to the DCI Format and the preset corresponding relationship, and carries out rate-matching for the downlink data according to the rate-matching resource information, thereby overcoming the problem of inaccurate downlink data rate-matching in the related art, so as to increase the accuracy of the downlink data rate-matching.

DESCRIPTION OF THE DRAWINGS

Drawings, provided for further understanding of the disclosure and forming a part of the specification, are used to explain the disclosure together with embodiments of the disclosure rather than to limit the disclosure. In the drawings:

FIG. 7 shows a schematic diagram of resource locations corresponding to the 2 port configuration of rate-matching information according to an embodiment of the disclosure; and FIG. 8 shows a schematic diagram of resource locations corresponding to the 4 port configuration of rate-matching information according to an embodiment of the disclosure.

DETAILED DESCRIPTION OF THE EMBODIMENTS

The disclosure is described below in detail by reference to the accompanying drawings in conjunction with embodiments. It should be noted that the embodiments and the characteristics of the embodiments can be combined with each other if no conflict is caused.

The rate-matching in an embodiment of the disclosure is mainly used for rate-matching of user resource elements, i.e., a base station notifies a terminal which resource elements in the transmitted resource block do not carry or map the corresponding data. After acquiring the information, the terminal may not receive the corresponding data at the corresponding locations.

Figure 1:
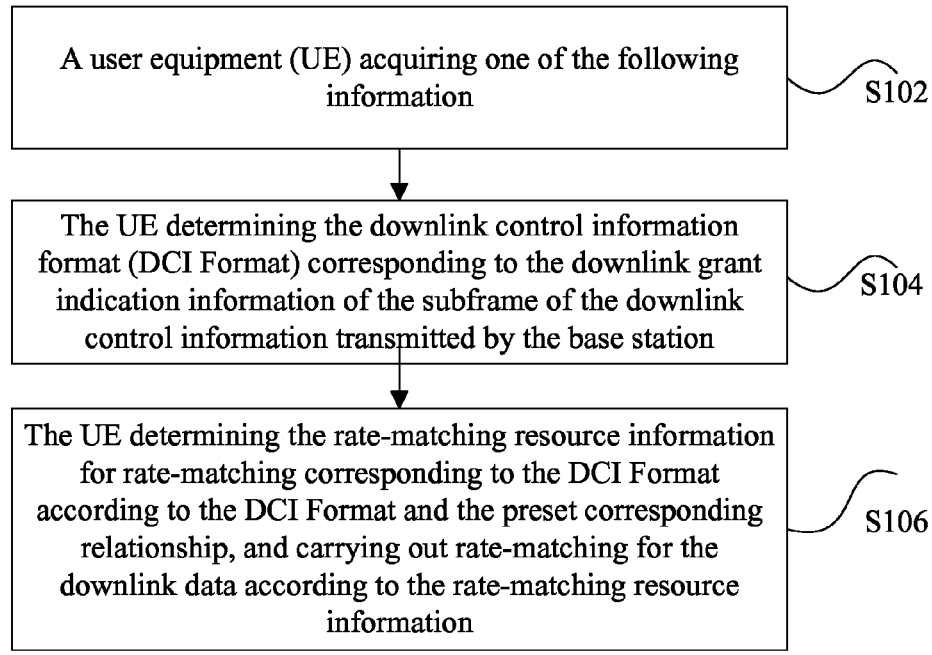
FIG. 1 shows a first flow chart of a downlink data rate-matching method according to an embodiment of the disclosure.

This example embodiment provides a downlink data rate-matching method. FIG. 1 shows a first flow chart of a downlink data rate-matching method according to an embodiment of the disclosure. As shown in FIG. 1, the method includes step S102 to step S106 as follows.

Step S102: a user equipment (UE) acquires one of the following information:

one or more sets of rate-matching resource indication information configured by a base station for instructing the UE to carry out rate-matching;

one or more sets of rate-matching resource indication information and combined rate-matching resource indication information, wherein the combined rate-matching resource indication information is used for indicating combination of one or more sets of rate-matching resource indication information; and rate-matching resource indication information of a serving cell of the UE acquired when the UE accesses a network.

Step S104: the UE determines downlink control information format (DCI Format) corresponding to downlink grant indication information of a subframe of downlink control information transmitted by the base station.

Step S106: the UE determines rate-matching resource information for rate-matching corresponding to the DCI Format according to the DCI Format and the preset corresponding relationship, and carries out rate-matching for the downlink data according to the rate-matching resource information, wherein the preset corresponding relationship includes one of the following: the corresponding relationship between the one or more sets of rate-matching resource indication information and the DCI Format, the corresponding relationship between the rate-matching resource indication information of the serving cell and the DCI Format, and the corresponding relationship between the combined rate-matching resource indication information and the DCI Format.

By the above-mentioned steps, the UE determines the rate-matching resource information for rate-matching corresponding to the DCI Format according to the DCI Format and the preset corresponding relationship, and carries out rate-matching for the downlink data according to the rate-matching resource information, thereby overcoming the problem of inaccurate downlink data rate-matching in the related art, so as to increase the accuracy of the downlink data rate-matching.

In the implementation, the rate-matching resource information may be determined according to different DCI Formats by many manners. This example embodiment provides the following implementation manners:

manner I: when the DCI Format corresponding to the downlink grant indication information is DCI Format 1A, the UE determines that the first set of rate-matching resource indication information or the resource indication information corresponding to the lowest index notified by the base station via the high layer signaling is the resource information for rate-matching;

manner II: when the DCI Format corresponding to the downlink grant indication information is DCI Format 1A, the UE determines that the rate-matching resource indication information of the serving cell of the UE acquired when the UE accesses a network is the resource information for rate-matching;

manner III: when the DCI Format corresponding to the downlink grant indication information is DCI Format 1A, the UE determines that the one set of rate-matching resource indication information configured for the DCI Format 1A by the base station via the terminal-specific high layer signaling is the resource information for rate-matching;

manner IV: when the DCI Format corresponding to the downlink grant indication information is DCI Format 1A, the UE determines that the base station instructs, for the DCI Format 1A of the UE, via first preset resource indication information to select which one of two sets of resource indication information configured via terminal-specific high layer signaling to serve as the resource information for rate-matching;

manner V: when the DCI Format corresponding to the downlink grant indication information is DCI Format 1A, the UE determines that the base station employs the second preset resource indication information corresponding to a preset state as the resource information for rate-matching, wherein contents of the second preset resource indication information are notified to the UE via the high layer signaling; and manner VI: when the DCI Format corresponding to the downlink grant indication information is DCI Format 2B, DCI Format 2C or DCI Format 2D, the UE determines that the third preset resource indication information in multiple sets of rate-matching resource indication information indicated by the base station via the high layer signaling is the resource information for rate-matching, the third preset resource indication information is indicated via a preset bit in the downlink grant indication information.

As an example implementation manner, in the above-mentioned manner IV, the first preset resource indication information may be instructed via the allocation bit of the Localized Virtual Resource Block/Distributed Virtual Resource Block (LVRB/DVRB) in the DCI Format 1A in a Multicast Broadcast Single Frequency Network (MBSFN) subframe.

In an example embodiment, when there is one preset state, the rate-matching resource indication information corresponding to the one preset state is used as the resource information for rate-matching. When there are two preset states, the allocation bit of LVRB/DVRB in the DCI Format 1A in the MBSFN subframe is used for instructing the UE to select the rate-matching resource indication information corresponding to which one of the two preset states as the resource information for rate-matching.

As an example implementation manner, the combined rate-matching resource information or rate-matching resource indication information corresponding to the second preset resource indication information is indicated via the preset state, wherein the combined rate-matching resource information includes resources corresponding to one or more sets of rate-matching resource indication information.

As an example implementation manner, in the above-mentioned manner VI, the combined rate-matching resource indication information or rate-matching resource indication information corresponding to the third preset resource indication information is indicated via the preset bit, wherein the combined rate-matching resource indication information includes resources corresponding to one or more sets of rate-matching resource indication information.

In the implementation, when a preset state is a state of 0, accordingly the second preset resource indication information is the rate-matching resource combination state 0; or when default state is a state of 00, accordingly the second preset resource indication information is the rate-matching resource combination state 0; or when a preset state is a state of 0, accordingly the second preset resource indication information is the first set of rate-matching resource; or when a preset state is a state of 00, accordingly the second preset resource indication information is the first set of rate-matching resource.

In the implementation, the preset bit being 0 indicates that the third preset resource indication information is the rate-matching resource combination state 0, and the preset bit being 1 indicates that the third preset resource indication information is the rate-matching resource combination state 1; or the preset bit being 00 indicates that third preset resource indication information is the rate-matching resource combination state 0, and the preset bit being 01 indicates that the third preset resource indication information is the rate-matching resource combination state 1; or the preset bit being 10 indicates that the third preset resource indication information is the rate-matching resource combination state 2, and the preset bit being 11 indicates that the third preset resource indication information is the rate-matching resource combination state 3; or the preset bit being 0 indicates that the third preset resource indication information is the first set of rate-matching resource, and the preset bit being 1 indicates that the third preset resource indication information is the second set of rate-matching resource; or the preset bit being 00 indicates that the third preset resource indication information is the first set of rate-matching resource, and the preset bit being 01 indicates that the third preset resource indication information is the second set of rate-matching resource; or the preset bit being 10 indicates that the third preset resource indication information is the third set of rate-matching resource, and the preset bit being 11 indicates that the third preset resource indication information is the third set of or the fourth set of rate-matching resource.

For improving the flexibility of instruction, the preset bit may be a newly added bit in the downlink grant indication information or an Nscid bit in the downlink grant indication information. Using the Nscid bit in the downlink grant indication information to carry out indication may increase the bit utilization rate.

In the implementation, the one set of rate-matching resource indication information or each set of rate-matching resource indication information in the multiple sets of rate-matching resource indication information may include at least one of the following: location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information, wherein the non-zero power CSI-RS configuration information at least includes the number of CSI-RS ports, CSI-RS period and subframe offset information, CSI-RS sequence identification information and CSI-RS resource element location information; the zero power CSI-RS configuration information at least includes zero power CSI-RS resource element location information, and zero power CSI-RS period and subframe offset information.

In an example embodiment, the above-mentioned CRS resource location information includes CRS frequency domain resource location information, wherein in the 1 port configuration, the location indexes are 0, 1, 2, 3, 4 and 5 indicated via 3 bit signaling, respectively representing that the CRS frequency shift is 0-5; and location indexes in the 2 port configuration and 4 port configuration are 0, 1 and 2 indicated via 2 bit signaling, respectively representing that the CRS frequency shift is 0-2.

In an example embodiment, the above-mentioned CRS resource location information includes CRS frequency domain resource location information, wherein in the 1 port configuration, the location indexes are 0, 1, 2, 3, 4 and 5 indicated via 3 bit signaling, respectively representing that the CRS frequency shift is 0-5; and location indexes in the 2 port configuration and 4 port configuration are 0, 1 and 2 indicated via 3 bit signaling, respectively representing that the CRS frequency shift is 0-2.

In an example embodiment, the CRS port information and frequency domain resource location information uses 9-bit-map signaling for indication.

In an example embodiment, the CRS resource location information configures a corresponding cell ID to acquire the resource location information corresponding to the CRS.

As an example implementation manner, the combined rate-matching resource indication information is configured by the base station and notified to the UE via high layer signaling to notify the UE of multiple rate-matching resource combinations, and indicate the rate-matching resource indication information contained in each rate-matching resource combination in each of the combined rate-matching resource indication information.

Figure 2:
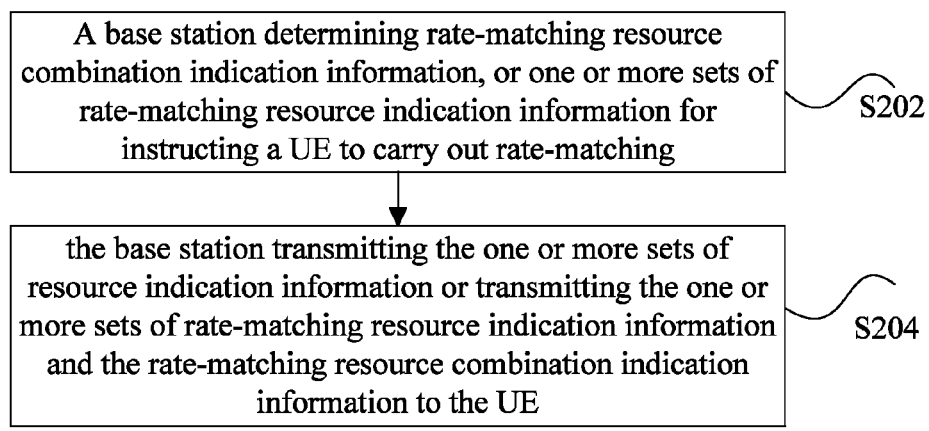
FIG. 2 shows a second flow chart of a downlink data rate-matching method according to an embodiment of the disclosure.

This embodiment provides a downlink data rate-matching method. FIG. 2 shows a second flow chart of a downlink data rate-matching method according to an embodiment of the disclosure. As shown in FIG. 2, the method includes step S202 to step S204 as follows.

Step S202: a base station determines one or more sets of rate-matching resource indication information or combined rate-matching resource indication information for instructing a UE to carry out rate-matching, wherein the combined rate-matching resource indication information is used for indicating combination of one or more sets of rate-matching resource indication information.

Step S204: the base station transmits one or more sets of resource indication information or transmits one or more sets of rate-matching resource indication information and combined rate-matching resource indication information to the UE, and activates the UE to, according to a downlink control information format (DCI Format) and a preset corresponding relationship corresponding to the downlink grant indication information in the subframe of the downlink control information transmitted by the base station, determine the rate-matching resource information for rate-matching corresponding to the DCI Format, and carry out rate-matching for the downlink data according to the rate-matching resource information, wherein the preset corresponding relationship includes one of the following: the corresponding relationship between the one or more sets of rate-matching resource indication information and the DCI Format, the corresponding relationship between the rate-matching resource indication information of the serving cell and the DCI Format, and the corresponding relationship between the combined rate-matching resource indication information and the DCI Format.

By the above-mentioned steps, the base station transmits the determined one or more sets of resource indication information or transmits one or more sets of rate-matching resource indication information and combined rate-matching resource indication information to the UE, and activates the UE to determine the rate-matching resource information for rate-matching corresponding to the DCI Format according to the DCI Format and the preset corresponding relationship, and carry out rate-matching for the downlink data according to the rate-matching resource information, thereby overcoming the problem of inaccurate downlink data rate-matching in the related art, so as to increase the accuracy of the downlink data rate-matching.

In the implementation, the preset corresponding relationship of the rate-matching resource indication information may be determined according to different DCI Formats by many manners, including one of the following:

when the DCI Format corresponding to the downlink grant indication information is DCI Format 1A, it is determined that the first set of resource indication information or the rate-matching resource indication information corresponding to the lowest index notified by the base station via the high layer signaling is the resource information for rate-matching;

when the DCI Format corresponding to the downlink grant indication information is the DCI Format 1A, it is determined that the rate-matching resource indication information of the serving cell of the UE acquired when the UE accesses a network is the resource information for rate-matching;

when the DCI Format corresponding to the downlink grant indication information is the DCI Format 1A, it is determined that the one set of rate-matching resource indication information configured for the DCI Format 1A by the base station via the terminal-specific high layer signaling is the resource information for rate-matching;

when the DCI Format corresponding to the downlink grant indication information is DCI Format 1A, it is determined that the base station instructs, for the DCI Format 1A of the UE, via first preset resource indication information to select which one of two sets of resource indication information configured via terminal-specific high layer signaling to serve as the resource information for rate-matching;

when the DCI Format corresponding to the downlink grant indication information is DCI Format 1A, it is determined that the second preset resource indication information corresponding to a preset state is the resource information for rate-matching, wherein contents of the second preset resource indication information are notified to the UE via the high layer signaling; and when the DCI Format corresponding to the downlink grant indication information is DCI Format 2B, DCI Format 2C or DCI Format 2D, it is determined that the third preset resource indication information in the multiple sets of resource indication information indicated by the base station via the high layer signaling is the resource information for rate-matching, wherein the third preset resource indication information is indicated via a preset bit in the downlink grant indication information.

In the implementation, the first preset resource indication information is instructed via the LVRB/DVRB allocation bit in DCI Format 1A of Multicast Broadcast Single Frequency Network (MBSFN) subframe.

In an example embodiment, when there is one preset state, the rate-matching resource indication information corresponding to the one preset state is used as the resource information for rate-matching. When there are two preset states, the allocation bit of LVRB/DVRB in the DCI Format 1A in the MBSFN subframe is used for instructing the UE to select the rate-matching resource indication information corresponding to which one of the two preset states as the resource information for rate-matching.

For improving the flexibility of instruction, the preset bit may be a newly added bit in the downlink grant indication information or an Nscid bit in the downlink grant indication information. Using the Nscid bit in the downlink grant indication information to carry out instruction may increase the bit utilization rate.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

In another embodiment, also provided is a downlink data rate-matching software for executing the technical solution described in the above-mentioned embodiments and the example embodiments.

In another embodiment, also provided is a storage medium storing the above-mentioned downlink data rate-matching software, the storage medium including but not limited to: optical disk, floppy disk, hard disk, erasable memory, etc.

The embodiments of the disclosure also provide a downlink data rate-matching device that can be applied to a UE. The downlink data rate-matching device may be used for implementing the above-mentioned downlink data rate-matching method and the example embodiments, which has been described and will not be explained here. The components in the downlink data rate-matching device are described below in detail. As used below, the term "component" is a combination of software and/or hardware capable of implementing predetermined functions. Although the system and method described in the following embodiment may be implemented by a software in some example embodiments, it would be conceived to implement hardware or a combination of software and hardware.

Figure 3:
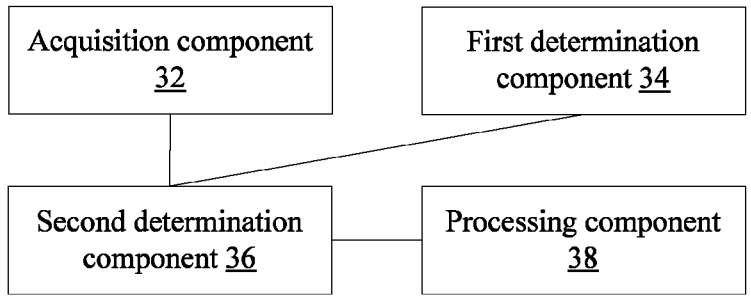
FIG. 3 shows a first structure diagram of a downlink data rate-matching device according to an embodiment of the disclosure.

FIG. 3 shows a first structure diagram of a downlink data rate-matching device according to an embodiment of the disclosure. As shown in FIG. 3, the device includes an acquisition component 32, a first determination component 34, a second determination component 36, and a processing component 38. The structure above is described below in detail.

The acquisition component 32 is configured to acquire one of the following information:

one or more sets of rate-matching resource indication information configured by a base station for instructing the UE to carry out rate-matching;

one or more sets of rate-matching resource indication information and combined rate-matching resource indication information, wherein the combined rate-matching resource indication information is used for indicating combination of one or more sets of rate-matching resource indication information; and the rate-matching resource indication information of the serving cell of the UE acquired when the UE accesses a network;

the first determination component 34 is configured to determine the downlink control information format (DCI Format) corresponding to the downlink grant indication information in a subframe of the downlink control information transmitted by the base station; the second determination component 36 is coupled with the acquisition component 32 and the first determination component 34 and configured to determine the rate-matching resource information for rate-matching corresponding to the DCI Format according to the DCI Format determined by the first determination component 34 and a preset corresponding relationship; and the processing component 38 is coupled with the second determination component 36 and configured to carry out rate-matching for the downlink data according to the rate-matching resource information determined by the second determination component 36, the preset corresponding relationship including one of the following: the corresponding relationship between the one or more sets of rate-matching resource indication information and the DCI Format, the corresponding relationship between the rate-matching resource indication information of the serving cell and the DCI Format, and the corresponding relationship between the combined rate-matching resource indication information and the DCI Format.

Figure 4:
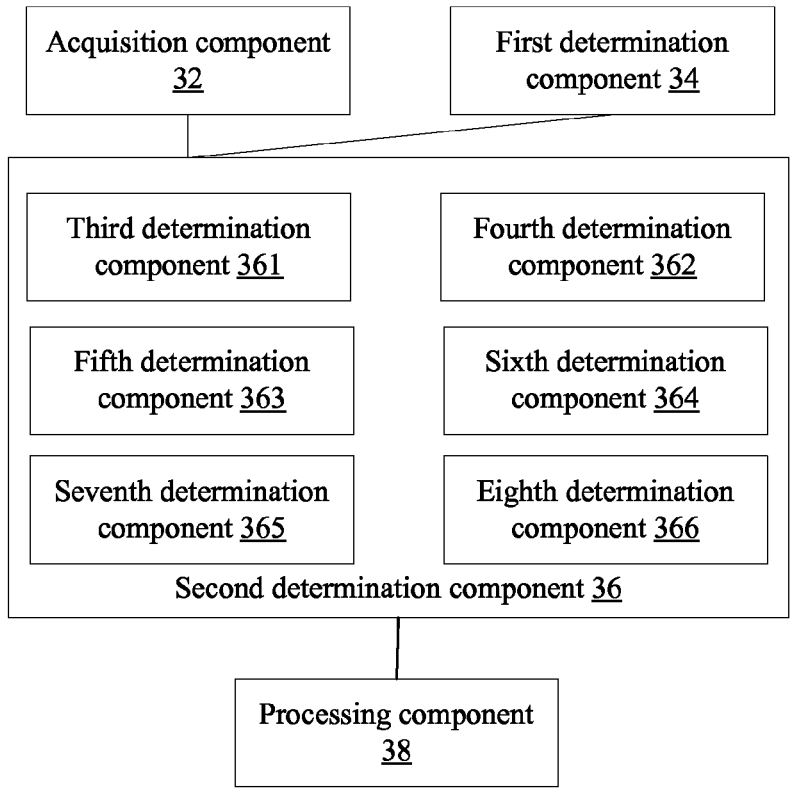
FIG. 4 shows an example first structure diagram of a downlink data rate-matching device according to an embodiment of the disclosure.

FIG. 4 shows an example first structure diagram of a downlink data rate-matching device according to an embodiment of the disclosure. As shown in FIG. 4, the second determination component 36 includes a third determination component 361, a fourth determination component 362, a fifth determination component 363, a sixth determination component 364, a seventh determination component 365, and an eighth determination component 366. The structure above is described below in detail.

The third determination component 361 is configured to, when the DCI Format corresponding to the downlink grant indication information is DCI Format 1A, determine that the first set of rate-matching resource indication information notified by the base station via the high layer signaling is the resource information for rate-matching; or the fourth determination component 362 is configured to, when the DCI Format corresponding to the downlink grant indication information is DCI Format 1A, determine that the rate-matching resource indication information of the serving cell of the UE acquired when the UE accesses a network is the resource information for rate-matching; or the fifth determination component 363 is configured to, when the DCI Format corresponding to the downlink grant indication information is DCI Format 1A, determine that one set of rate-matching resource indication information configured for the DCI Format 1A by the base station via the terminal-specific high layer signaling is the resource information for rate-matching; or the sixth determination component 364 is configured to, when the DCI Format corresponding to the downlink grant indication information is DCI Format 1A, determine that the base station instructs, for the DCI Format 1A of the UE, via first preset resource indication information to select which one of two sets of resource indication information configured via terminal-specific high layer signaling to serve as the resource information for rate-matching; or the seventh determination component 365 is configured to, when the DCI Format corresponding to the downlink grant indication information is DCI Format 1A, determine that the base station employs the second preset resource indication information corresponding to a preset state as the resource information for rate-matching, wherein contents of the second preset resource indication information are notified to the UE via the high layer signaling; or the eighth determination component 366 is configured to, when the DCI Format corresponding to the downlink grant indication information is DCI Format 2B, DCI Format 2C or DCI Format 2D, determine that the third preset resource indication information in the multiple sets of rate-matching resource indication information indicated by the base station via the high layer signaling is the resource information for rate-matching, wherein the third preset resource indication information is indicated via the preset bit in the downlink grant indication information.

The embodiments of the disclosure also provide a downlink data rate-matching device that can be applied to a base station. The downlink data rate-matching device may be used for implementing the above-mentioned downlink data rate-matching method and the example embodiments, which has been described and will not be explained here. The components in the downlink data rate-matching device are described below in detail. As used below, the term "component" is a combination of software and/or hardware capable of implementing predetermined functions. Although the system and method described in the following embodiment may be preferably implemented by a software, it would be conceived to implement hardware or a combination of software and hardware.

Figure 5:
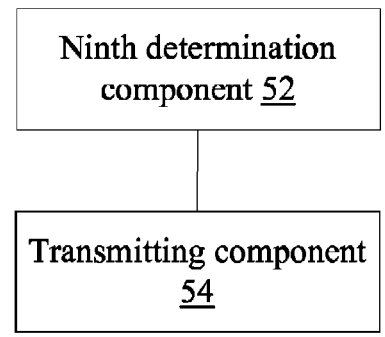
FIG. 5 shows a second structure diagram of a downlink data rate-matching device according to an embodiment of the disclosure.

FIG. 5 shows a second structure diagram of a downlink data rate-matching device according to an embodiment of the disclosure. As shown in FIG. 5, the device includes a ninth determination component 52 and a transmitting component 54. The structure above is described below in detail.

The ninth determination component 52 is configured to determine combined rate-matching resource indication information or one or more sets of rate-matching resource indication information for instructing a user equipment (UE) to carry out rate-matching, wherein the combined rate-matching resource indication information is used for indicating combination of the one or more sets of rate-matching resource indication information; and the transmitting component 54 is coupled with the ninth determination component 52 and configured to transmit the one or more sets of resource indication information, or transmit the one or more sets of rate-matching resource indication information and the combined rate-matching resource indication information determined by the ninth determination component 52 to the UE, and activate the UE to determine, according to the downlink control information format (DCI Format) and preset corresponding relationship of the downlink control information corresponding to the downlink grant indication information in the subframe of the downlink control information transmitted by the base station, the rate-matching resource information for rate-matching corresponding to the DCI Format, and to carry out rate-matching for the downlink data according to the rate-matching resource information, wherein the preset corresponding relationship includes one of the following: the corresponding relationship between the one or more sets of rate-matching resource indication information and the DCI Format, the corresponding relationship between the rate-matching resource indication information of the serving cell and the DCI Format, and the corresponding relationship between the combined rate-matching resource indication information and the DCI Format.

In an example embodiment, the preset corresponding relationship includes one of the following:

when the DCI Format corresponding to the downlink grant indication information is DCI Format 1A, it is determined that the first set of resource indication information or the rate-matching resource indication information corresponding to the lowest index notified by the base station via the high layer signaling is the resource information for rate-matching;

when the DCI Format corresponding to the downlink grant indication information is the DCI Format 1A, it is determined that the rate-matching resource indication information of the serving cell of the UE acquired when the UE accesses a network is the resource information for rate-matching;

when the DCI Format corresponding to the downlink grant indication information is the DCI Format 1A, it is determined that the one set of rate-matching resource indication information configured for the DCI Format 1A by the base station via the terminal-specific high layer signaling is the resource information for rate-matching;

when the DCI Format corresponding to the downlink grant indication information is DCI Format 1A, it is determined that the base station instructs, for the DCI Format 1A of the UE, via first preset resource indication information to select which one of two sets of resource indication information configured via terminal-specific high layer signaling to serve as the resource information for rate-matching;

when the DCI Format corresponding to the downlink grant indication information is DCI Format 1A, it is determined that the second preset resource indication information corresponding to a preset state is the resource indication information for rate-matching, wherein contents of the second preset resource indication information are notified to the UE via the high layer signaling; and when the DCI Format corresponding to the downlink grant indication information is DCI Format 2B, DCI Format 2C or DCI Format 2D, it is determined that the third preset resource indication information in the multiple sets of resource indication information indicated by the base station via the high layer signaling is the resource indication information for rate-matching, wherein the third preset resource indication information is indicated via the preset bit in the downlink grant indication information.

Example Embodiment I

This example embodiment provides a downlink data rate-matching method, including step S302 to step S308 as follows.

Step S302: a UE receiving one or more sets of resource indication information (rate-matching resource indication information) transmitted by a base station and used for instructing the UE to carry out rate-matching.

Step S304: the UE receiving a subframe in which the base station transmits the downlink control information, and acquiring the downlink grant indication information in the subframe.

Step S306: the UE determining the corresponding resource indication information according to the detected DCI Format to carry out rate-matching, including the following manners:

Manner I: when the UE detects that the downlink grant indication information employs DCI Format 1A, employing the first set of resource indication information notified by the base station high layer signaling or the rate-matching resource indication information corresponding to the lowest index (rate-matching resource indication information) to carry out rate-matching.

Manner II: when the UE detects that the downlink grant indication information employs the DCI Format 1A, employing the synchronously detected resource indication information of the serving cell when the UE accesses a network to carry out rate-matching.

manner III: when the UE detects that the downlink grant indication information employs the DCI Format 1A, employing the resource indication information configured for the terminal DCI Format 1A by the base station side via the terminal-specific high layer signaling to carry out rate-matching.

Manner IV: when the UE detects that the downlink grant indication information employs the DCI Format 1A, employing the LVRB/DVRB allocation bit in the DCI Format 1A in the MBSFN subframe to instruct to select, for the DCI Format 1A of the UE, which one of the two sets of resource indication information configured by the base station side via the terminal-specific high layer signaling to carry out rate-matching demapping.

Manner V: when the UE detects that the downlink grant indication information employs the DCI Format 1A, employing the resource indication information corresponding to the state of 0 or the state of 00 notified by the base station via the high layer signaling to carry out rate-matching.

Manner VI: when the UE detects that the downlink grant indication information employs the DCI Format 1A, employing the resource indication information corresponding to the state of 0 or the state of 01 notified by the base station via the high layer signaling to carry out rate-matching.

Manner VII: when the UE detects that the downlink grant indication information employs the DCI Format 1A, employing the LVRB/DVRB allocation bit in the DCI Format 1A in the MBSFN subframe to instruct to select the resource corresponding to which state of the state of 00 and the state of 01 notified by the base station via the high layer signaling to carry out rate-matching. When the UE detects that the downlink grant indication information employs DCI Format 2B or DCI Format 2C or DCI Format 2D, employing 2 bits in the downlink grant control signaling to instruct to select one of the multiple sets of resource indication information notified by the base station via the high layer signaling to carry out rate-matching.

Step S308: the UE carrying out rate-matching for the downlink data transmitted on the resource location to the UE.

In an example embodiment, one bit is employed to instruct the rate-matching resource combination state, or 2 bits are employed to instruct four rate-matching resource combination states, each rate-matching resource consisting of one or more rate-matching resources. The rate-matching resource combination represented by each state is indicated by the base station via terminal-specific high layer instruction

TABLE 3

| State indicated by 1 bit | Rate-matching resource combination state |
|---|---|
| 0 | Rate-matching resource combination state 0 |
| 1 | Rate-matching resource combination state 1 |

TABLE 4

| State indicated by 2 bits | Rate-matching resource combination state |
|---|---|
| 00 | Rate-matching resource combination state 0 |
| 01 | Rate-matching resource combination state 1 |
| 10 | Rate-matching resource combination state 2 |
| 11 | Rate-matching resource combination state 3 |

In an example embodiment, the above-mentioned rate-matching resource combination represented by each state is indicated by the base station via the terminal-specific high layer instruction. The high layer signaling consists of N-bit bitmap sequence, and in an example embodiment, N is 2 or 4.

As an example embodiment, one bit is employed to instruct the rate-matching resource combination state, or 2 bits are employed to instruct four rate-matching resource combination states, each rate-matching resource consisting of one or more rate-matching resources. The rate-matching resource combination represented by each state is indicated by the base station via terminal-specific high layer instruction.

TABLE 5

| State indicated by 1 bit | Rate-matching resource combination state |
| --- | --- |
| 0 | First set of rate-matching resource |
| 1 | Second set of rate-matching resource |

TABLE 6

| State indicated by 2 bits | Rate-matching resource combination state |
| --- | --- |
| 00 | First set of rate-matching resource |
| 01 | Second set of rate-matching resource |
| 10 | Third set of rate-matching resource |
| 11 | Fourth set of rate-matching resource |

As an example embodiment, the above-mentioned resource location includes at least one of the following: location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information, wherein the non-zero power CSI-RS configuration information at least comprises the number of CSI-RS ports, CSI-RS period and subframe offset information, CSI-RS sequence identification information and CSI-RS resource element location information; the zero power CSI-RS configuration information at least comprises zero power CSI-RS resource element location information, and zero power CSI-RS period and subframe offset information.

In an example embodiment, configurations for the number of the CRS ports comprise 0 port configuration, 1 port configuration, 2 port configuration and 4 port configuration.

In an example embodiment, the CRS resource location information comprises CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2 indicated via 2-bit signaling, respectively representing that the CRS frequency shifts are 0-2.

In an example embodiment, the CRS resource location information comprises CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2 indicated via 3-bit signaling, respectively representing that the CRS frequency shifts are 0-2.

In an example embodiment, the CRS port information and frequency domain resource location information uses 9-bit-map signaling for indication. Each set of rate-matching resource contains a 9-bit bitmap sequence for indicating the corresponding number of CRS ports and the frequency domain location combination.

In an example embodiment, the CRS resource location information configures a corresponding cell ID to acquire the resource location information corresponding to the CRS.

Example Embodiment II

In this example embodiment, UE1 is a user of R11 or higher, a base station side configures the UE1 with two, three or four sets of rate-matching resource indication information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching mapping for the data, according to the first set of resource indication information notified to the terminal via the high layer signaling or the rate-matching resource indication information corresponding to the lowest index, and then performs data transmission.

The UE1 receives the two sets of resource location indication information transmitted by the base station, then detects the PDCCH or ePDCCH region on the downlink subframe, expecting to acquire the downlink control information. When the UE1 detects that the downlink grant indication information employs DCI Format 1A, the first set of resource indication information notified by the base station via the high layer signaling or the rate-matching resource indication information corresponding to the lowest index is used to carry out rate-matching for the received data.

Example Embodiment III

In this example embodiment, UE1 is a user of R11 or higher, a base station side configures the UE1 with two sets of rate-matching resource indication information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching mapping for data using the rate-matching resource information of the serving cell detected synchronously when the corresponding terminal accesses a network.

The UE1 receives two sets of resource location indication information transmitted from the base station, then detects the PDCCH or ePDCCH region on the downlink subframe, expecting to acquire the downlink control information. When the UE1 detects that the downlink grant indication information employs DCI Format 1A, the UE1 carries out rate-matching detection for data using the rate-matching resource information of the serving cell detected synchronously when the corresponding terminal accesses a network.

Example Embodiment IV

In this example embodiment, UE1 is a user of R11 or higher, a base station side configures the UE1 with three sets of rate-matching resource indication information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching mapping for data using the resource indication information of the serving cell detected synchronously when the corresponding terminal accesses a network.

The UE1 receives the three or four sets of resource location indication information transmitted from the base station, then detects the PDCCH or ePDCCH region on the downlink subframe, expecting to acquire the downlink control information. When the UE1 detects that the downlink grant indication information employs DCI Format 1A, the UE1 carries out rate-matching detection for data using the resource indication information of the serving cell detected synchronously when the corresponding terminal accesses a network.

Example Embodiment V

In this example embodiment, UE1 is a user of R11 or higher, a base station side configures the UE1 with two sets of rate-matching resource indication information via high layer signaling, in addition, the base station side configures the UE1 with the rate-matching resource indication information specific for DCI Format 1A via terminal-specific high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching mapping for data using rate-matching resource indication information specific for DCI Format 1A.

The UE1 acquires the two sets of resource location indication information and the rate-matching resource indication information specific for DCI Format 1A transmitted from the base station by receiving the terminal-specific high layer signaling, then detects the PDCCH or ePDCCH region on the downlink subframe, expecting to acquire the downlink control information. When the UE1 detects that the downlink grant indication information employs DCI Format 1A, the UE1 carries out rate-matching demapping for data using the rate-matching resource indication information specific for DCI Format 1A.

Example Embodiment VI

In this example embodiment, UE1 is a user of R11 or higher, a base station side configures the UE1 with three or four sets of rate-matching resource indication information via high layer signaling, in addition, the base station side configures the UE1 with the rate-matching resource indication information specific for DCI Format 1A via terminal-specific high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching mapping for data using rate-matching resource indication information specific for DCI Format 1A.

The UE1 acquires the three or four sets of resource location indication information and the rate-matching resource indication information specific for DCI Format 1A transmitted from the base station by receiving the terminal-specific high layer signaling, then detects the PDCCH or ePDCCH region on the downlink subframe, expecting to acquire the downlink control information. When the UE1 detects that the downlink grant indication information employs DCI Format 1A, the UE1 carries out rate-matching demapping for data using the rate-matching resource indication information specific for DCI Format 1A.

Example Embodiment VII

In this example embodiment, UE1 is a user of R11 or higher, a base station side configures the UE1 with three or four sets of rate-matching resource indication information and the combination information thereof via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching using the combined rate-matching resource information corresponding to the state of 0 notified by the base station via high layer signaling. Here, there are two states of 0 and 1, and the combined rate-matching resource information corresponding to each state is shown in Table 7. Which rate-matching resource indication information constitutes the rate-matching resource combination state 0 and the rate-matching resource combination state 1 is indicated by the terminal-specific high layer signaling configured by the base station.

TABLE 7

| State indicated by 1 bit | Rate-matching resource combination state |
|---|---|
| 0 | Rate-matching resource combination state 0 |
| 1 | Rate-matching resource combination state 1 |

The UE1 receives the three or four sets of resource location indication information transmitted from the base station, then detects the PDCCH or ePDCCH region on the downlink subframe, expecting to acquire the downlink control information. When the UE1 detects that the downlink grant indication information employs DCI Format 1A, the UE1 carries out rate-matching using the combined rate-matching resource information which is corresponding to the state 0 indicated by 2 bits and is notified by the base station via high layer signaling.

Example Embodiment VIII

In this example embodiment, UE1 is a user of R11 or higher, a base station side configures the UE1 with three or four sets of rate-matching resource indication information and resource combination information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching using the combined rate-matching resource information corresponding to the state of 00 and notified by the base station via high layer signaling.

Here, there are four states of 00, 01, 10 and 11, and the combined rate-matching resource information corresponding to each state is shown in Table 8. Which rate-matching resource indication information constitutes the combined rate-matching resource indication information 0, 1, 2 and 3 is indicated by the terminal-specific high layer signaling configured by the base station.

The UE1 receives the three or four sets of resource location indication information transmitted from the base station, then detects the PDCCH or ePDCCH region on the downlink subframe, expecting to acquire the downlink control information. When the UE1 detects that the downlink grant indication information employs DCI Format 1A, the UE1 carries out rate-matching using the resource indication information combination which is corresponding to the state of 00 and is notified by the base station via high layer signaling.

A configuration method for the state of 2 bits is shown in Table 8.

TABLE 8

| State indicated by 2 bits | Rate-matching resource combination state |
| --- | --- |
| 00 | Combined rate-matching resource indication information 0 |
| 01 | Combined rate-matching resource indication information 1 |
| 10 | Combined rate-matching resource indication information 2 |
| 11 | Combined rate-matching resource indication information 3 |

Example Embodiment IX

In this example embodiment, UE1 is a user of R11 or higher, a base station side configures the UE1 with three or four sets of resource location indication information and rate-matching combination resource indication information via high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant signaling is DCI Format 2B or DCI Format 2C or DCI Format 2D, Nscid 1 bit in the downlink grant control signaling is employed to instruct to select one of the two sets of rate-matching combination resource indication information notified by the base station via high layer signaling to carry out rate-matching mapping.

Here, there are two states of 0 and 1, and the combined rate-matching resource indication information corresponding to each state is shown in Table 7. Which rate-matching resource indication information constitutes the combined rate-matching resource indication information 0 and 1 is indicated by the terminal-specific high layer signaling configured by the base station.

In an example embodiment, the high layer signaling consists of two 4-bit bitmap sequences. Each bitmap sequence corresponds to four resource indication information combinations under one state. The corresponding bit being 0 represents that the corresponding resource information is not contained in the corresponding state, and the bit being 1 represents that the corresponding resource information is contained in the corresponding state. Since three or four sets of resource location indication information are configured, the bitmap sequence has a length of 4, actually, the length of bitmap sequence is equal to the maximum number of the configurable rate-matching information.

The UE1 receives three or four sets of resource location indication information transmitted from the base station, then detects the PDCCH or ePDCCH region on the downlink subframe, expecting to acquire the downlink control information. When the UE1 detects that the downlink grant signaling is DCI Format 2B or DCI Format 2C or DCI Format 2D, the UE1 carries out rate-matching demapping using one of the two sets of combined rate-matching resource indication information that are notified by the base station via high layer signaling under the instruction of Nscid 1 bit in the downlink grant control signaling.

A configuration method for the state of 1 bit is shown in Table 7.

Example Embodiment X

In this example embodiment, UE1 is a user of R11 or higher, a base station side configures the UE1 with three or four sets of resource location instruct information via terminal-specific high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching using the resource indication information which is corresponding to the state of 00 and is notified by the base station via high layer signaling.

The rate-matching resource to which one state corresponds is notified or predefined by an extra high layer signaling. In an example embodiment, the state 00 corresponds to the first set of rate-matching resource, the state 01 corresponds to the second set of rate-matching resource, the state 10 corresponds to the third set of rate-matching resource, and the state 11 corresponds to the third or fourth set of rate-matching resource.

The UE1 receives the three or four sets of resource location indication information transmitted from the base station, then detects the PDCCH or ePDCCH region on the downlink subframe, expecting to acquire the downlink control information. When the UE1 detects that the downlink grant indication information employs DCI Format 1A, the UE1 carries out rate-matching using the resource indication information which is corresponding to the state of 00 and is notified by the base station via high layer signaling.

A configuration method for the state of 2 bits is shown in Table 9.

TABLE 9

| State indicated by 2 bits | Rate-matching resource combination state |
| --- | --- |
| 00 | First set of rate-matching resource |
| 01 | Second set of rate-matching resource |
| 10 | Third set of rate-matching resource |
| 11 | Third or fourth set of rate-matching resource |

Example Embodiment XI

In this example embodiment, UE1 is a user of R11 or higher, a base station side configures the UE1 with two sets of resource location indication information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant indication information is configured as DCI Format 1A, the base station carries out rate-matching using the resource indication information which is corresponding to the state of 0 indicated by the 1 bit Nscid and is notified by the base station via high layer signaling.

The rate-matching resource to which one state corresponds is notified or predefined by an extra high layer signaling. In an example embodiment, the first set of rate-matching resource corresponds to the state 0, and the second set of rate-matching resource corresponds to the state 1.

The UE1 receives the two sets of resource location indication information transmitted from the base station, then detects the PDCCH or ePDCCH region on the downlink subframe, expecting to acquire the downlink control information. When the UE1 detects that the downlink grant indication information employs DCI Format 1A, the UE1 carries out rate-matching using the resource indication information which is corresponding to the state of 0 indicated by the 1 bit Nscid and is notified by the base station via high layer signaling.

A configuration method for the state of 1 bit is shown in Table 10.

TABLE 10

| 1-Bit instruction state | Rate-matching resource combination state |
| --- | --- |
| 0 | First set of rate-matching resource |
| 1 | Second set of rate-matching resource |

Example Embodiment XII

In this example embodiment, UE1 is a user of R11 or higher, a base station side configures the UE1 with three or four sets of resource location indication information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant signaling is DCI Format 2B or DCI Format 2C or DCI Format 2D, 2 bits in the downlink grant control signaling are employed to instruct to select one of the multiple sets of resource indication information notified by the base station via high layer signaling to carry out rate-matching mapping.

The rate-matching resource to which one state corresponds is notified or predefined by an extra high layer signaling. In an example embodiment, the state 00 corresponds to the first set of rate-matching resource, the state 01 corresponds to the second set of rate-matching resource, the state 10 corresponds to the third set of rate-matching resource, and the state 11 corresponds to the third or fourth set of rate-matching resource.

The UE1 receives three or four sets of resource location indication information transmitted from the base station, then detects the PDCCH or ePDCCH region on the downlink subframe, expecting to acquire the downlink control information. When the UE1 detects that the downlink grant signaling is DCI Format 2B or DCI Format 2C or DCI Format 2D, the UE1 carries out rate-matching demapping using one of the multiple sets of resource indication information that are notified by the base station via high layer signaling under the instruction of 2 bits in the downlink grant control signaling.

A configuration method for the state of 2 bits is shown in Table 9.

Example Embodiment XIII

It is supposed that UE1 is a user of R11 or higher, a base station side configures the UE1 with two sets of resource location indication information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format.

When the downlink grant signaling is DCI Format 2B or DCI Format 2C or DCI Format 2D, 1 bit Nscid in the downlink grant control signaling is employed to instruct to select one of the multiple sets of resource indication information notified by the base station via high layer signaling to carry out rate-matching mapping.

The rate-matching resource to which one state corresponds is notified or predefined by an extra high layer signaling. In an example embodiment, the first set of rate-matching resource corresponds to the state 0, and the second set of rate-matching resource corresponds to the state 1.

The UE1 receives two sets of resource location indication information transmitted from the base station, then detects the PDCCH or ePDCCH region on the downlink subframe, expecting to acquire the downlink control information. When the UE1 detects that the downlink grant signaling is DCI Format 2B or DCI Format 2C or DCI Format 2D, the UE1 carries out rate-matching demapping using one of the two sets of resource indication information that are notified by the base station via high layer signaling under the instruction of the 1 bit Nscid in the downlink grant control signaling.

A configuration method for the state of 1 bit is shown in Table 10.

Example Embodiment XIV

It is supposed that UE1 is a user of R11 or higher, a base station side configures the UE1 with two sets of resource location indication information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant signaling is DCI Format 1A and it is detected that the subframe is a MBSFN subframe, the LVRB/DVRB bit in DCI Format 1A is used for instructing to select one of the multiple sets of resource indication information notified by the base station via high layer signaling to carry out rate-matching mapping.

The rate-matching resource to which one state corresponds is notified or predefined by an extra high layer signaling. In an example embodiment, the first set of rate-matching resource corresponds to the state 0, and the second set of rate-matching resource corresponds to the state 1.

The UE1 receives two sets of resource location indication information transmitted from the base station, then detects the PDCCH or ePDCCH region on the downlink subframe, expecting to acquire the downlink control information. When the UE1 detects that the downlink grant signaling is DCI Format 1A, the UE1 carries out rate-matching demapping using one of the two sets of resource indication information that are notified by the base station via high layer signaling under the instruction of the LVRB/DVRB bit in DCI Format 1A.

A configuration method for the state of 1 bit is shown in Table 10.

Example Embodiment XV

It is supposed that UE1 is a user of R11 or higher, a base station side configures the UE1 with three or four sets of rate-matching resource indication information and combined rate-matching resource information via the high layer signaling, then transmits DL_Grant (i.e., downlink grant) information in a PDCCH or EPDCCH region on the downlink service subframe in need of scheduling the UE1 to indicate that there is downlink data for UE1 in the current subframe, and transmits the downlink grant information carried by the physical downlink control channel (PDCCH) or enhanced physical downlink control channel (EPDCCH) according to the determined downlink grant information format. When the downlink grant signaling is DCI Format 1A and it is detected that the subframe is a MBSFN subframe, the LVRB/DVRB bit in DCI Format 1A is used for instructing to select one of the two sets of combined rate-matching resource information notified by the base station via high layer signaling to carry out rate-matching mapping.

Which rate-matching resource indication information constitutes each set of combined rate-matching resource information is notified by an extra high layer signaling.

The UE1 receives three or four sets of rate-matching resource indication information and combined rate-matching resource information transmitted from the base station, then detects the PDCCH or ePDCCH region on the downlink subframe, expecting to acquire the downlink control information. When the UE1 detects that the downlink grant signaling is DCI Format 1A, the UE1 carries out rate-matching demapping using one of the two sets of combined rate-matching resource information that are notified by the base station via high layer signaling under the instruction of the LVRB/DVRB bit in DCI Format 1A.

Example Embodiment XVI

In this example embodiment, the rate-matching resource indication information at least includes one or more of the following information:

the initial location of physical downlink shared channel (PDSCH), the configuration of Multicast Broadcast Single Frequency Network (MBSFN) subframe corresponding to the resource location, the number of cell-specific reference signal (CRS) ports, the resource location of CRS, and zero power CSI-RS configuration or CSI process index indication.

The configurations for the number of the CRS ports include 0 port configuration, 1 port configuration, 2 port configuration, and 4 port configuration. When the configuration is 0 port configuration, no rate-matching for any CRS resource element is carried out.

Figure 6:
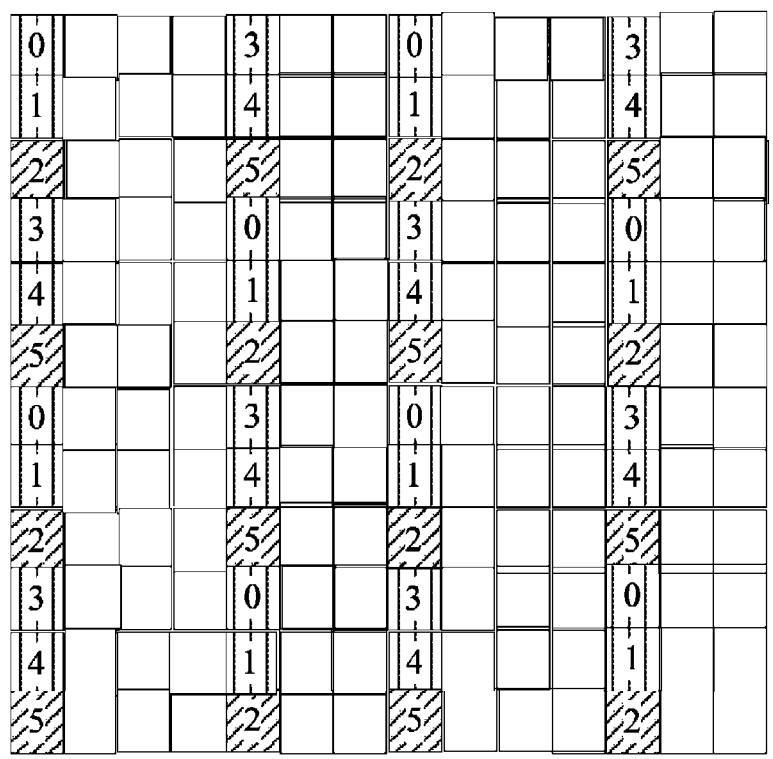
FIG. 6 shows a schematic diagram of resource locations corresponding to the 1 port configuration of rate-matching information according to an embodiment of the disclosure.
Figures 7, 8:
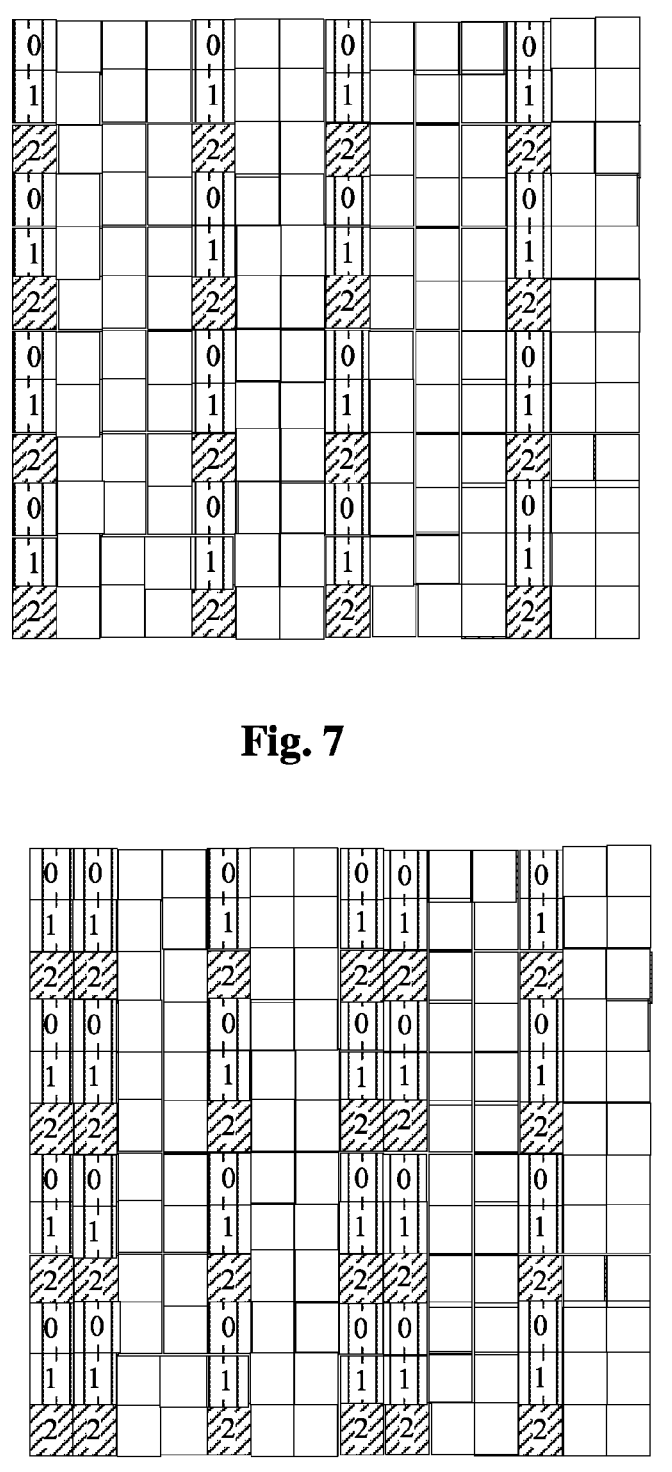

The above-mentioned CRS resource location information includes CRS frequency domain resource location information, and the location indexes in the 1 port configuration are 0, 1, 2, 3, 4 and 5, respectively representing that the CRS frequency shifts are 0-5, and are indicated using 6-bit bitmap sequence signaling, with each bit corresponding to one CRS frequency shift index resource. The location indexes in the 2 port configuration and 4 port configuration are 0, 1 and 2, respectively representing that the CRS frequency shifts are 0-2, and are indicated using 3 bit bitmap sequence signaling, with each bit corresponding to one CRS frequency shift index resource. In the bitmap sequence, the bit being 0 represents that no CRS rate-matching resource exists in the corresponding resources, and the bit being 1 represents that the CRS rate-matching resource exists in the corresponding resource. The resource locations corresponding to the bits are shown in FIGS. 6, 7 and 8.

Example Embodiment XVII

In this example embodiment, the rate-matching resource indication information at least includes one or more of the following information:

the initial location of physical downlink shared channel (PDSCH), the configuration of Multicast Broadcast Single Frequency Network (MBSFN) subframe corresponding to the resource location, the number of cell-specific reference signal (CRS) port, the resource location of CRS, and zero power CSI-RS or CSI process index indication.

The configurations for the number of the CRS ports include 0 port configuration, 1 port configuration, 2 port configuration, and 4 port configuration. When the configuration is 0 port configuration, no rate-matching for any CRS resource element is carried out.

The above-mentioned CRS resource location information includes CRS frequency domain resource location information, and the location indexes in the 1 port configuration are 0, 1, 2, 3, 4 and 5, respectively representing that the CRS frequency shifts are 0-5, and are indicated using 6-bit bitmap sequence signaling, with each bit corresponding to one CRS frequency shift index resource. The location indexes in the 2 port configuration and 4 port configuration are 0, 1 and 2, respectively representing that the CRS frequency shifts are 0-2, and are indicated using 6-bit bitmap sequence signaling, with the first 3 bits or the bit 0, 2 and 4 each corresponding to one CRS frequency shift index resource. In the bitmap sequence, the bit being 0 represents that no CRS rate-matching resource exists in the corresponding resources, and the bit being 1 represents that the CRS rate-matching resource exists in the corresponding resource. The resource locations corresponding to the bits are shown in FIGS. 6, 7 and 8.

Example Embodiment XVIII

In this example embodiment, the rate-matching resource indication information at least includes one or more of the following information:
the initial location of physical downlink shared channel (PDSCH), the configuration of Multicast Broadcast Single Frequency Network (MBSFN) subframe corresponding to the resource location, the number of cell-specific reference signal (CRS) port, the resource location of CRS, and zero power CSI-RS or CSI process index indication.

The configurations for the number of the CRS ports include 0 port configuration, 1 port configuration, 2 port configuration, and 4 port configuration. When the configuration is 0 port configuration, no rate-matching for any CRS resource element is carried out.

The above-mentioned CRS resource location information includes CRS frequency domain resource location information, and the location indexes in the 1 port configuration are 0, 1, 2, 3, 4 and 5, respectively representing that the CRS frequency shifts are 0-5, and the corresponding CRS frequency shift index resource is indicated using 3-bit index signaling. The location indexes in the 2 port configuration and 4 port configuration are 0, 1 and 2, respectively representing that the corresponding CRS frequency shifts are 0-2, and the corresponding CRS frequency shift index resource is indicated using 2- or 3-bit index signaling. The resource locations corresponding to the CRS frequency shifts are shown in FIGS. 6, 7 and 8.

Example Embodiment XIX

In this example embodiment, the rate-matching resource indication information at least includes one or more of the following information:
the initial location of physical downlink shared channel (PDSCH), the configuration of Multicast Broadcast Single Frequency Network (MBSFN) subframe corresponding to the resource location, the number of cell-specific reference signal (CRS) port, the resource location of CRS, and zero power CSI-RS or CSI process index indication.

The above-mentioned number of the CRS ports and the frequency resource location information are instructed using 9-bit bitmap sequence.

The first 6 bits respectively indicate 6 CRS locations of the corresponding resource according to OFDM symbols 0, 4, 7 and 11 in FIG. 6, and the last 3 bits are used for indicating the 3 CRS resource locations on the OFDM symbols 1 and 8 in FIG. 7.

Example Embodiment XX

In this example embodiment, a configuration method for combined rate-matching resource indication information is shown as follows:

a base station indicating the rate-matching resource indication information corresponding to a terminal by configuring three sets of rate-matching resource indication information as follows:
rate-matching resource indication information 0;
rate-matching resource indication information 1; and
rate-matching resource indication information 2;
then the base station side configuring combined rate-matching resource indication information to the terminal side via the terminal-specific high layer signaling:
combined rate-matching resource indication information 0: 0, 1, 1 (bitmap sequence) and
combined rate-matching resource indication information 1: 1, 0, 0 (bitmap sequence).

Each bit in the bitmap sequence indicates whether the corresponding rate-matching resource indication information is contained in the corresponding combined rate-matching resource indication information. For example, the combined rate-matching resource indication information 0 indicates that the rate-matching resource indication information 1 and the rate-matching resource indication information 2 are contained in the combined rate-matching resource indication information 0, i.e., the terminal should carry out rate-matching according to the rate-matching resource indication information 1 and the rate-matching resource indication information 2; and the combined rate-matching resource indication information 1 indicates that the rate-matching resource indication information 0 should be contained in the combined rate-matching resource indication information 1, i.e., the terminal should carry out rate-matching according to the rate-matching resource indication information 0.

By the above-mentioned example embodiments, a downlink data rate-matching method and device are provided. The UE determines the rate-matching resource information for rate-matching corresponding to the DCI Format according to the DCI Format and the preset corresponding relationship, and carries out rate-matching for the downlink data according to the rate-matching resource information, thereby overcoming the problem of inaccurate downlink data rate-matching in the related art, so as to increase the accuracy of the downlink data rate-matching.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The above description is only example embodiments of the disclosure and is not intended to limit the disclosure, and the disclosure can have a variety of changes and modifications for ordinary person skilled in the field. Any modification, equivalent replacement, or improvement made without departing from the principle of the disclosure should fall within the protection scope defined by the appended claims of the disclosure.

What is claimed is:

1. A downlink data rate-matching method, comprising:
a user equipment (UE) acquiring one of the following information:
one or more sets of rate-matching resource indication information configured by a base station for instructing the UE to carry out rate-matching,
the one or more sets of rate-matching resource indication information and combined rate-matching resource indication information, wherein the combined rate-matching resource indication information is used for indicating combination of the one or more sets of rate-matching resource indication information, and
rate-matching resource indication information of a serving cell of the UE acquired when the UE accesses a network;
the UE determining downlink control information format (DCI Format) corresponding to downlink grant indication information in a subframe of downlink control information transmitted from the base station; and
the UE determining rate-matching resource information for rate-matching corresponding to the DCI Format according to the DCI Format and a preset corresponding relationship, and carrying out a rate-matching operation for downlink data according to the rate-matching resource information, wherein the preset corresponding relationship comprises one of the following: a corresponding relationship between the one or more sets of rate-matching resource indication information and the DCI Format, a corresponding relationship between the rate-matching resource indication information of the serving cell and the DCI Format, and a corresponding relationship between the combined rate-matching resource indication information and the DCI Format.

2. The method according to claim 1, wherein the UE determining the rate-matching resource information for rate-matching corresponding to the DCI Format according to the DCI Format and the preset corresponding relationship comprises one of the following:
when the DCI Format corresponding to the downlink grant indication information is DCI Format 1A, the UE determining that the first set of rate-matching resource indication information or the rate-matching resource indication information corresponding to the lowest index notified by the base station via high layer signaling is the resource information for rate-matching;
when the DCI Format corresponding to the downlink grant indication information is the DCI Format 1A, the UE determining that the rate-matching resource indication information of the serving cell of the UE acquired when the UE accesses a network is the resource information for rate-matching;
when the DCI Format corresponding to the downlink grant indication information is the DCI Format 1A, the UE determining that one set of rate-matching resource indication information configured for the DCI Format 1A by the base station via terminal-specific high layer signaling is the resource information for rate-matching;
when the DCI Format corresponding to the downlink grant indication information is the DCI Format 1A, the UE determining that the base station instructs, for the DCI Format 1A of the UE, via first preset resource indication information to select which one of two sets of resource indication information configured via terminal-specific high layer signaling to serve as the resource information for rate-matching;
when the DCI Format corresponding to the downlink grant indication information is the DCI Format 1A, the UE determining that the base station uses second preset resource indication information corresponding to a preset state as the resource information for rate-matching, wherein contents of the second preset resource indication information are notified to the UE via the high layer signaling; and
when the DCI Format corresponding to the downlink grant indication information is DCI Format 2B, DCI Format 2C or DCI Format 2D, the UE determining that third preset resource indication information in multiple sets of rate-matching resource indication information indicated by the base station via the high layer signaling is the resource information for rate-matching, wherein the third preset resource indication information is indicated via a preset bit in the downlink grant indication information.

3. The method according to claim 2, wherein the first preset resource indication information is indicated via localized virtual resource block/distributed virtual resource block (LVRB/DVRB) allocation bit in the DCI Format 1A in a Multicast Broadcast Single Frequency Network (MBSFN) subframe.

4. The method according to claim 2, wherein
when there is one preset state, rate-matching resource indication information corresponding to the one preset state is used as the resource information for rate-matching;
when there are two preset states, LVRB/DVRB allocation bit in the DCI Format 1A in an MBSFN subframe is used for instructing the UE to select the rate-matching resource indication information corresponding to which one of the two preset states as the resource information for rate-matching.

5. The method according to claim 2, wherein the combined rate-matching resource information or rate-matching resource indication information corresponding to the second preset resource indication information is indicated via the preset state, wherein the combined rate-matching resource information comprises resources corresponding to one or more sets of rate-matching resource indication information.

6. The method according to claim 2, wherein the combined rate-matching resource indication information or rate-matching resource indication information corresponding to the third preset resource indication information is indicated via the preset bit, wherein the combined rate-matching resource indication information comprises resources corresponding to one or more sets of rate-matching resource indication information.

7. The method according to claim 5, wherein
when the preset state is a state of 0, the corresponding second preset resource indication information is rate-matching resource combination state 0; or
when the preset state is a state of 00, the corresponding second preset resource indication information is rate-matching resource combination state 0; or
when the preset state is a state of 0, the corresponding second preset resource indication information is the first set of rate-matching resource; or
when the preset state is a state of 00, the corresponding second preset resource indication information is the first set of rate-matching resource.

8. The method according to claim 5, wherein
the preset bit being 0 indicates that the third preset resource indication information is rate-matching resource combination state 0, and the preset bit being 1 indicates that the third preset resource indication information is rate-matching resource combination state 1; or the preset bit being 00 indicates that the third preset resource indication information is rate-matching resource combination state 0, and the preset bit being 01 indicates that the third preset resource indication information is rate-matching resource combination state 1; or the preset bit being 10 indicates that the third preset resource indication information is rate-matching resource combination state 2, and the preset bit being 11 indicates that the third preset resource indication information is rate-matching resource combination state 3; or the preset bit being 0 indicates that the third preset resource indication information is the first set of rate-matching resource, and the preset bit being 1 indicates that the third preset resource indication information is the second set of rate-matching resource; or the preset bit being 00 indicates that the third preset resource indication information is the first set of rate-matching resource, and the preset bit being 01 indicates that the third preset resource indication information is the second set of rate-matching resource; or the preset bit being 10 indicates that the third preset resource indication information is the third set of rate-matching resource, and the preset bit being 11 indicates that the third preset resource indication information is the third or fourth set of rate-matching resource.

9. The method according to claim 2, wherein the preset bit is a newly added bit in the downlink grant indication information or an Nscid bit in the downlink grant indication information.

10. The method according to claim 1, wherein the one set of rate-matching resource indication information or each set of rate-matching resource indication information in the multiple sets of rate-matching resource indication information comprises at least one of the following:

location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information.

11. The method according to claim 10, wherein configurations for the number of the CRS ports comprise 0 port configuration, 1 port configuration, 2 port configuration and 4 port configuration.

12. The method according to claim 10, wherein the CRS resource location information comprises CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2, respectively representing that the CRS frequency shifts are 0-2.

13. The method according to claim 10, wherein the CRS resource location information comprises CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2 indicated via 3-bit signaling, respectively representing that the CRS frequency shifts are 0-2.

14. The method according to claim 10, wherein CRS port information and frequency domain resource location information are indicated using 9-bitmap signaling.

15. The method according to claim 10, wherein the CRS resource location information configures a corresponding cell identity (ID) to acquire the resource location information corresponding to CRS.

16. The method according to claim 1, wherein the combined rate-matching resource indication information is configured by the base station and notified to the UE via high layer signaling to notify the UE of multiple rate-matching resource combinations, and indicate the rate-matching resource indication information contained in each rate-matching resource combination in each of the combined rate-matching resource indication information.

17. The method according to claim 2, wherein the one set of rate-matching resource indication information or each set of rate-matching resource indication information in the multiple sets of rate-matching resource indication information comprises at least one of the following:

location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information.

18. The method according to claim 5, wherein the one set of rate-matching resource indication information or each set of rate-matching resource indication information in the multiple sets of rate-matching resource indication information comprises at least one of the following:

location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information.

19. The method according to claim 6, wherein the one set of rate-matching resource indication information or each set of rate-matching resource indication information in the multiple sets of rate-matching resource indication information comprises at least one of the following:

location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information.

20. The method according to claim 7, wherein the one set of rate-matching resource indication information or each set of rate-matching resource indication information in the multiple sets of rate-matching resource indication information comprises at least one of the following:

location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information.

21. The method according to claim 8, wherein the one set of rate-matching resource indication information or each set of rate-matching resource indication information in the multiple sets of rate-matching resource indication information comprises at least one of the following:

location information of a resource element in need of rate-matching or interference cancellation; an initial location of a physical downlink shared channel (PDSCH), configuration of a Multicast Broadcast Single Frequency Network (MBSFN) subframe corresponding to the resource location, the number of cell-specific reference signal (CRS) ports, resource location information of CRS, cell identity, zero power CSI-RS configuration information, and non-zero power CSI-RS configuration information.

22. The method according to claim 17, wherein configurations for the number of the CRS ports comprise 0 port configuration, 1 port configuration, 2 port configuration and 4 port configuration.

23. The method according to claim 21, wherein configurations for the number of the CRS ports comprise 0 port configuration, 1 port configuration, 2 port configuration and 4 port configuration.

24. The method according to claim 17, wherein the CRS resource location information comprises CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2, respectively representing that the CRS frequency shifts are 0-2.

25. The method according to claim 21, wherein the CRS resource location information comprises CRS frequency domain resource location information, wherein location indexes in the 1 port configuration are 0, 1, 2, 3, 4 and 5 indicated via 3-bit signaling, respectively representing that the CRS frequency shifts are 0-5; and location indexes in the 2 port configuration and 4 port configuration are 0, 1 and 2, respectively representing that the CRS frequency shifts are 0-2.

26. The method according to claim 2, wherein the combined rate-matching resource indication information is configured by the base station and notified to the UE via high layer signaling to notify the UE of multiple rate-matching resource combinations, and indicate the rate-matching resource indication information contained in each rate-matching resource combination in each of the combined rate-matching resource indication information.

27. The method according to claim 8, wherein the combined rate-matching resource indication information is configured by the base station and notified to the UE via high layer signaling to notify the UE of multiple rate-matching resource combinations, and indicate the rate-matching resource indication information contained in each rate-matching resource combination in each of the combined rate-matching resource indication information.

28. A downlink data rate-matching method, comprising:
a base station determining combined rate-matching resource indication information or one or more sets of rate-matching resource indication information for instructing a user equipment (UE) to carry out rate-matching, wherein the combined rate-matching resource indication information is used for indicating the combination of the one or more sets of rate-matching resource indication information;

the base station transmitting the one or more sets of rate-matching resource indication information or transmitting the one or more sets of rate-matching resource indication information and the combined rate-matching resource indication information to the UE, activating the UE to determine, according to a downlink control information format (DCI Format) corresponding to downlink grant indication information in a subframe of downlink control information transmitted from the base station and a preset corresponding relationship, rate-matching resource information for rate-matching corresponding to the DCI Format, and carry out a rate-matching operation for downlink data according to the rate-matching resource information, wherein the preset corresponding relationship comprises one of the following: a corresponding relationship between the one or more sets of rate-matching resource indication information and the DCI Format, a corresponding relationship between rate-matching resource indication information of a serving cell and the DCI Format, and a corresponding relationship between the combined rate-matching resource indication information and the DCI Format.

29. The method according to claim 28, wherein the preset corresponding relationship comprises one of the following:

when the DCI Format corresponding to the downlink grant indication information is DCI Format 1A, determining that the first set of resource indication information or the rate-matching resource indication information corresponding to the lowest index notified by the base station via high layer signaling is the resource information for rate-matching;

when the DCI Format corresponding to the downlink grant indication information is the DCI Format 1A, determining that the rate-matching resource indication information of serving cell of the UE acquired when the UE accesses a network is the resource information for rate-matching;

when the DCI Format corresponding to the downlink grant indication information is the DCI Format 1A, determining that one set of rate-matching resource indication information configured for the DCI Format 1A by the base station via terminal-specific high layer signaling is the resource information for rate-matching;

when the DCI Format corresponding to the downlink grant indication information is the DCI Format 1A, determining that the base station instructs, for the DCI Format 1A of the UE, via first preset resource indication information to select which one of two sets of resource indication information configured via terminal-specific high layer signaling to serve as the resource information for rate-matching;

when the DCI Format corresponding to the downlink grant indication information is the DCI Format 1A, determining that second preset resource indication information corresponding to a preset state is the resource information for rate-matching, wherein contents of the second preset resource indication information are notified to the UE via the high layer signaling; and when the DCI Format corresponding to the downlink grant indication information is DCI Format 2B, DCI Format 2C or DCI Format 2D, determining that third preset resource indication information in multiple sets of rate-matching resource indication information indicated by the base station via the high layer signaling is the resource information for rate-matching, wherein the third preset resource indication information is indicated via a preset bit in the downlink grant indication information.

30. The method according to claim 29, wherein the first preset resource indication information is indicated via localized virtual resource block/distributed virtual resource block (LVRB/DVRB) allocation bit in the DCI Format 1A in a Multicast Broadcast Single Frequency Network (MBSFN) subframe.

31. The method according to claim 29, wherein
when there is one preset state, the rate-matching resource indication information corresponding to the one preset state is used as the resource information for rate-matching;
when there are two preset states, LVRB/DVRB allocation bit in the DCI Format 1A in an MBSFN subframe is used for instructing the UE to select the rate-matching resource indication information corresponding to which one of the two preset states as the resource information for rate-matching.

32. The method according to claim 29, wherein the preset bit is a newly added bit in the downlink grant indication information or an Nscid bit in the downlink grant indication information.

33. A downlink data rate-matching device applied to user equipment (UE), comprising:
an acquisition component configured to acquire one of the following information:
one or more sets of rate-matching resource indication information configured by a base station for instructing the UE to carry out rate-matching,
the one or more sets of rate-matching resource indication information and combined rate-matching resource indication information, wherein the combined rate-matching resource indication information is used for indicating combination of the one or more sets of rate-matching resource indication information, and
rate-matching resource indication information of a serving cell of the UE acquired when the UE accesses a network;
a first determination component configured to determine downlink control information format (DCI Format) corresponding to downlink grant indication information in a subframe of downlink control information transmitted from the base station;
a second determination component configured to determine rate-matching resource information for rate-matching corresponding to the DCI Format according to the DCI Format and a preset corresponding relationship; and
a processing component configured to carry out a rate-matching operation for downlink data according to the rate-matching resource information, wherein the preset corresponding relationship comprises one of the following: a corresponding relationship between the one or more sets of rate-matching resource indication information and the DCI Format, a corresponding relationship between the rate-matching resource indication information of the serving cell and the DCI Format, and a corresponding relationship between the combined rate-matching resource indication information and the DCI Format.

34. The device according to claim 33, wherein the second determination component comprises:
a third determination component configured to, when the DCI Format corresponding to the downlink grant indication information is DCI Format 1A, determine the first set of rate-matching resource indication information or the rate-matching resource indication information corresponding to the lowest index notified by the base station via high layer signaling is the resource information for rate-matching; or
a fourth determination component configured to, when the DCI Format corresponding to the downlink grant indication information is the DCI Format 1A, determine that the rate-matching resource indication information of the serving cell of the UE acquired when the UE accesses a network is the resource information for rate-matching; or
a fifth determination component configured to, when the DCI Format corresponding to the downlink grant indication information is the DCI Format 1A, determine that one set of rate-matching resource indication information configured for the DCI Format 1A by the base station via terminal-specific high layer signaling is the resource information for rate-matching; or
a sixth determination component configured to, when the DCI Format corresponding to the downlink grant indication information is the DCI Format 1A, determine that the base station instructs, for the DCI Format 1A of the UE, via first preset resource indication information to select which one of two sets of resource indication information configured via terminal-specific high layer signaling to serve as the resource information for rate-matching; or
a seventh determination component configured to, when the DCI Format corresponding to the downlink grant indication information is the DCI Format 1A, determine that the base station uses second preset resource indication information corresponding to a preset state as the resource information for rate-matching, wherein contents of the second preset resource indication information are notified to the UE via the high layer signaling; or
an eighth determination component configured to, when the DCI Format corresponding to the downlink grant indication information is DCI Format 2B, DCI Format 2C or DCI Format 2D, determine that third preset resource indication information in multiple sets of rate-matching resource indication information indicated by the base station via the high layer signaling is the resource information for rate-matching, wherein the third preset resource indication information is indicated via a preset bit in the downlink grant indication information.

35. A downlink data rate-matching device applied to base station, comprising:
a ninth determination component configured to determine combined rate-matching resource indication information or one or more sets of rate-matching resource indication information for instructing a user equipment (UE) to carry out rate-matching, wherein the combined rate-matching resource indication information is used for indicating the combination of the one or more sets of rate-matching resource indication information;

a transmitting component configured to transmit the one or more sets of rate-matching resource indication information or transmit the one or more sets of rate-matching resource indication information and the combined rate-matching resource indication information to the UE, activate the UE to determine, according to a downlink control information format (DCI Format) corresponding to downlink grant indication information in a sub frame of downlink control information transmitted from the base station and a preset corresponding relationship, rate-matching resource information for rate-matching corresponding to the DCI Format, and to carry out a rate-matching operation for the downlink data according to the rate-matching resource information, wherein the preset corresponding relationship comprises one of the following: a corresponding relationship between the one or more sets of rate-matching resource indication information and the DCI Format, a corresponding relationship between rate-matching resource indication information of a serving cell and the DCI Format, and a corresponding relationship between the combined rate-matching resource indication information and the DCI Format.

36. The device according to claim 35, wherein the preset corresponding relationship comprises one of the following:

when the DCI Format corresponding to the downlink grant indication information is DCI Format 1A, determining that the first set of resource indication information or the rate-matching resource indication information corresponding to the lowest index notified by the base station via high layer signaling is the resource information for rate-matching;

when the DCI Format corresponding to the downlink grant indication information is the DCI Format 1A, determining that the resource indication information of serving cell detected when accessing a network is the resource information for rate-matching;

when the DCI Format corresponding to the downlink grant indication information is the DCI Format 1A, determining that one set of resource indication information configured for the DCI Format 1A by the base station via terminal-specific high layer signaling is the resource information for rate-matching;

when the DCI Format corresponding to the downlink grant indication information is the DCI Format 1A, determining that the base station instructs, for the DCI Format 1A of the UE, via first preset resource indication information to select which one of two sets of resource indication information configured via terminal-specific high layer signaling to serve as the resource information for rate-matching;

when the DCI Format corresponding to the downlink grant indication information is the DCI Format 1A, determining that second preset resource indication information corresponding to a preset state is the resource information for rate-matching, wherein contents of the second preset resource indication information are notified to the UE via the high layer signaling; and when the DCI Format corresponding to the downlink grant indication information is DCI Format 2B, DCI Format 2C or DCI Format 2D, determining that third preset resource indication information in multiple sets of rate-matching resource indication information indicated by the base station via the high layer signaling is the resource information for rate-matching, wherein the third preset resource indication information is indicated via a preset bit in the downlink grant indication information.

* * * * *